Oct. 30, 1956
G. E. TINKESS ET AL
2,768,567
POWER ACTUATED MECHANISM FOR USE ON
AGRICULTURAL IMPLEMENTS
AND THE LIKE
Filed April 22, 1952
4 Sheets-Sheet 1
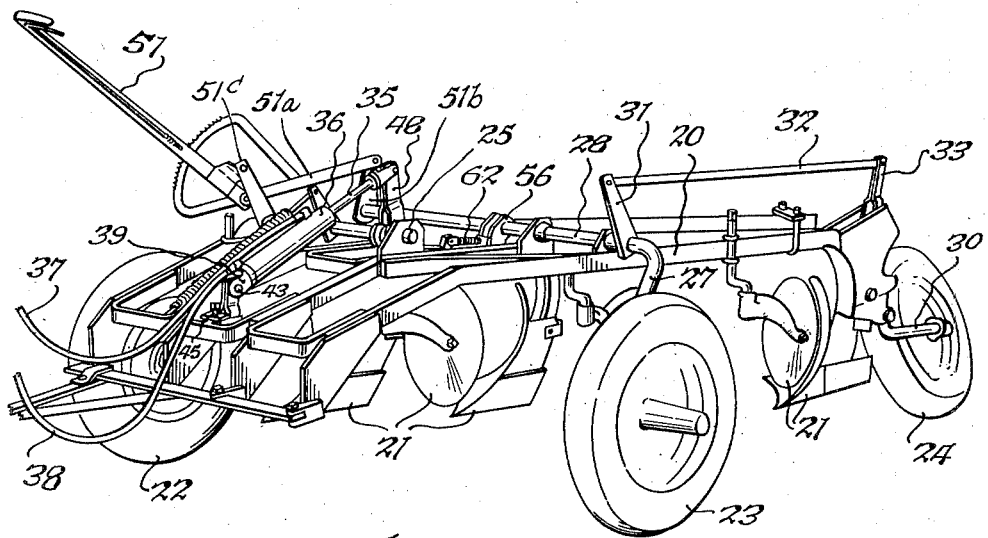
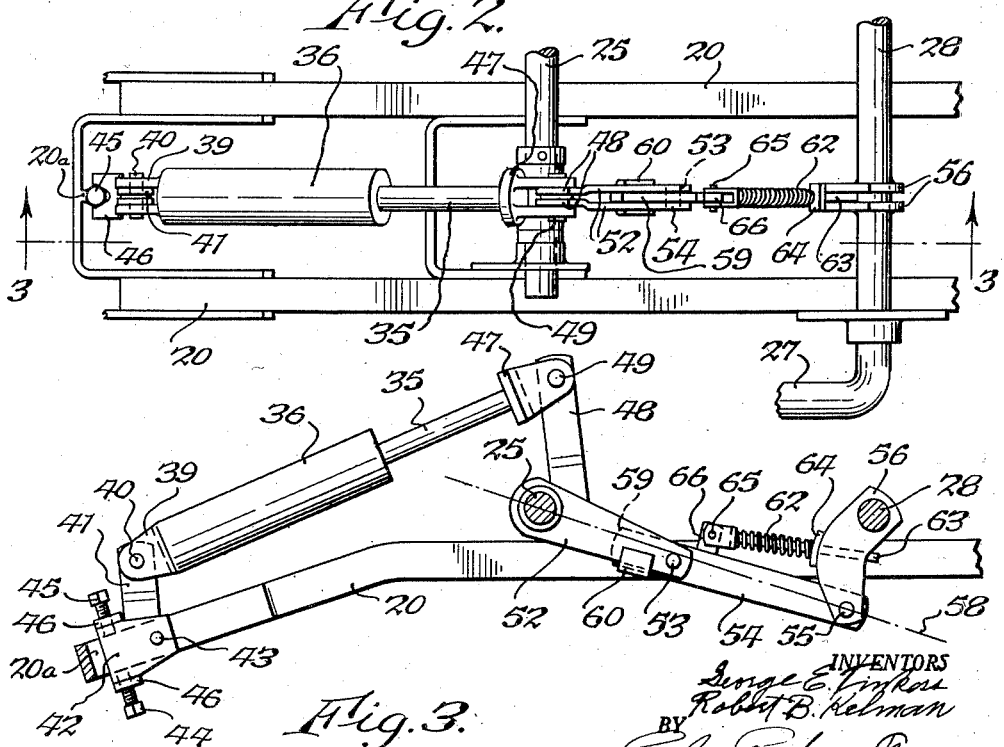
INVENTORS
George E. Tinkess
Robert B. Kelman
BY
Parker, Rockman & Farmer
Attorneys.

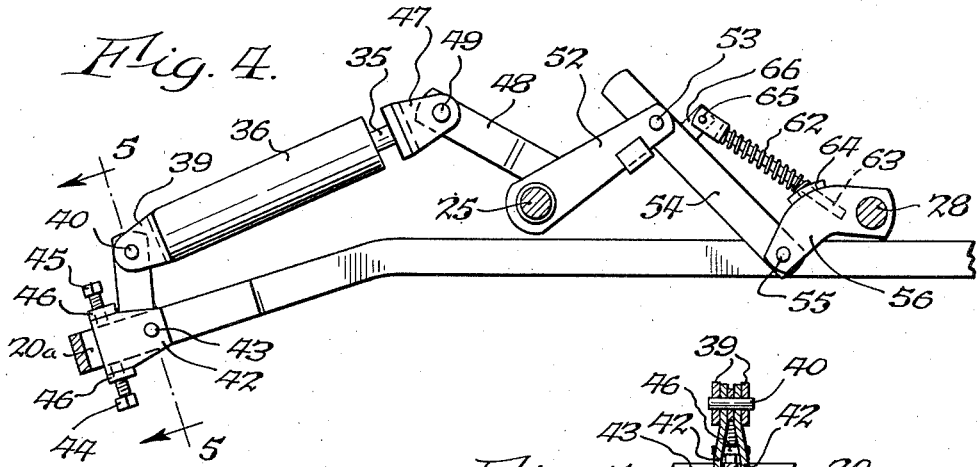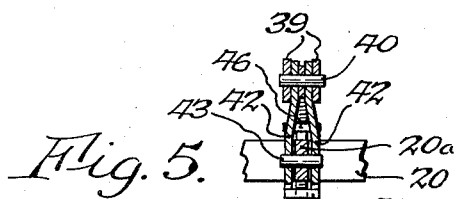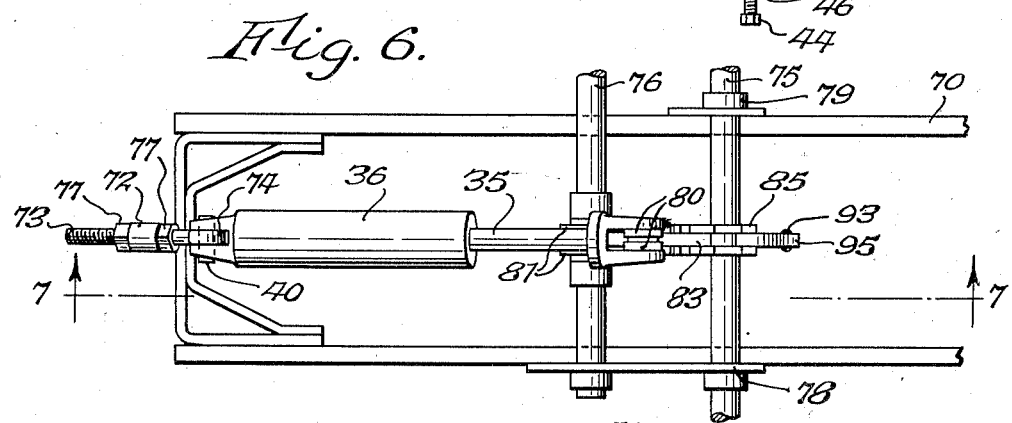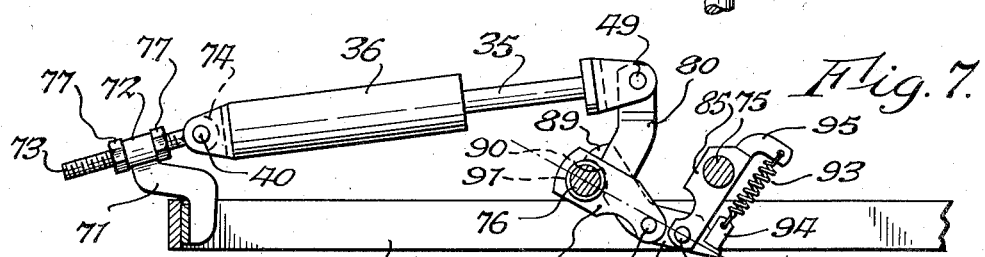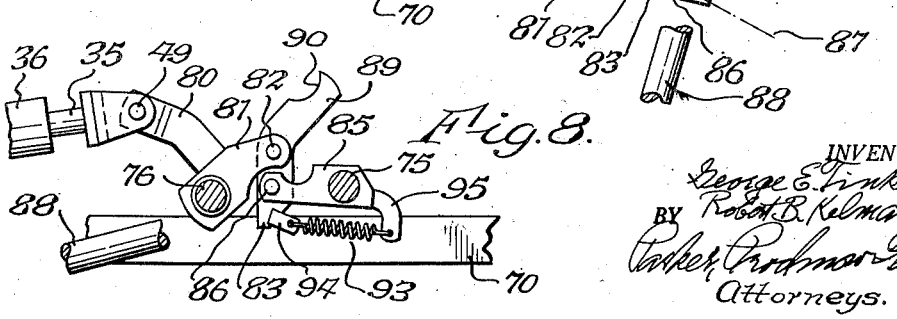

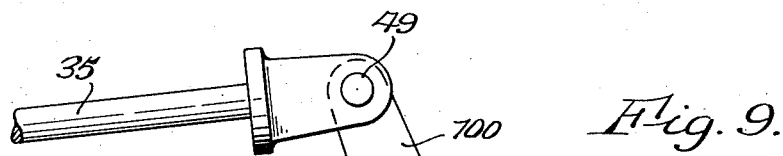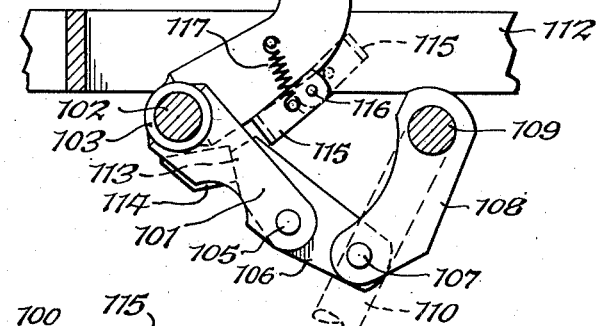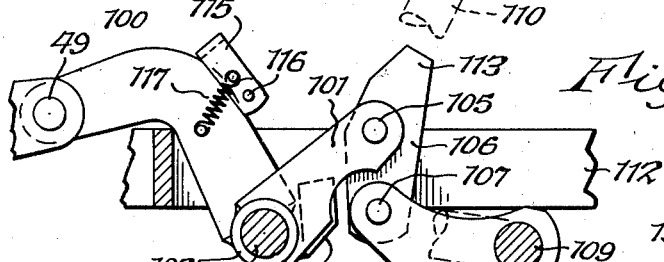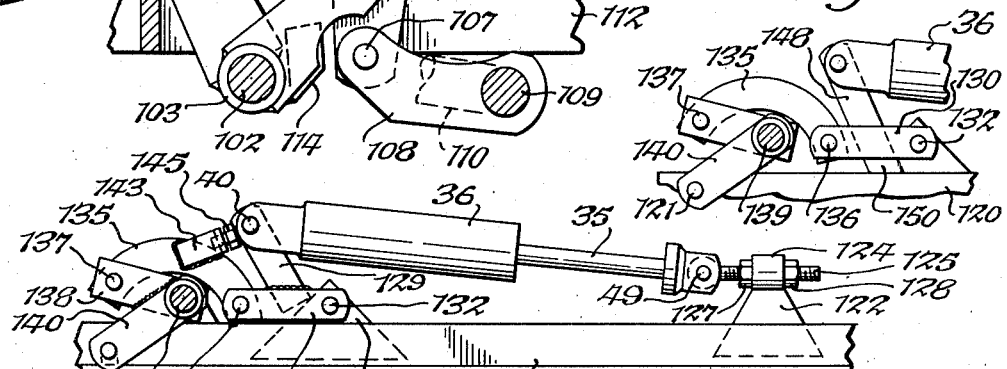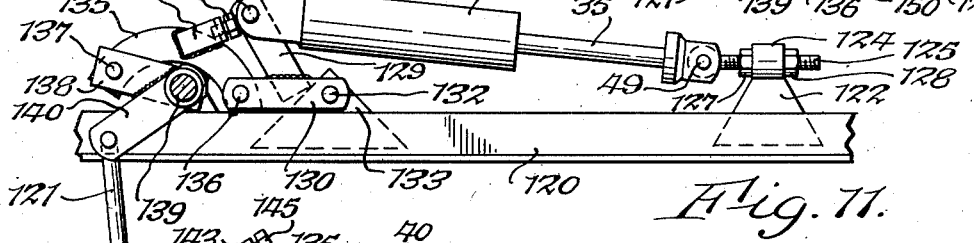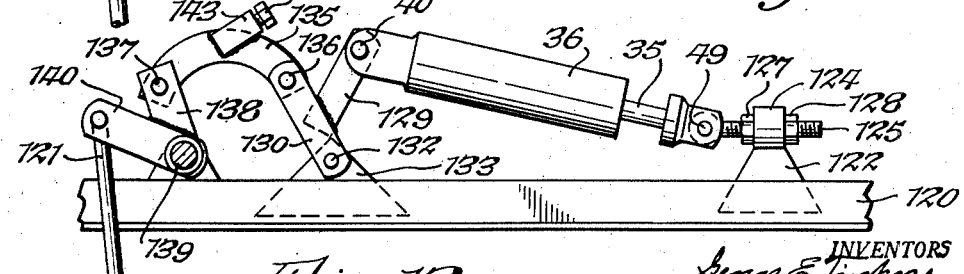

Oct. 30, 1956

G. E. TINKESS ET AL 2,768,567

POWER ACTUATED MECHANISM FOR USE ON
AGRICULTURAL IMPLEMENTS
AND THE LIKE

Filed April 22, 1952

ced Oct. 30, 1956

2,768,567

POWER ACTUATED MECHANISM FOR USE ON AGRICULTURAL IMPLEMENTS AND THE LIKE

George E. Tinkess, St. George, Ontario, and Robert B. Kelman, Brantford, Ontario, Canada, assignors to Cockshutt Farm Equipment Limited, Brantford, Ontario, Canada Application April 22, 1952, Serial No. 283,672

11 Claims. (Cl. 97—46.61)

This invention relates to improvements in agricultural or ground working implements of the type in which a part or parts of the mechanism are raised, lowered or otherwise shifted by a power device.

One of the objects of this invention is to provide implements of this kind with mechanism actuated by a power unit by means of which the shiftable part is placed into a position in which it will be automatically held against movement out of such position when the power unit becomes inoperative or is removed from the implement. Another object is to provide a mechanism of this kind which is so constructed that the power unit can easily be removed or replaced on the implement by a single person. It is also an object of this invention to provide means for adjusting the position of the power unit in such a manner that when the parts of the implement are in transport position there will be no pressure on the power unit, so that the same may be easily removed from or applied to the implement. A further object is to provide mechanism of this type which may be moved by the power device beyond the dead center position whereby the shiftable part will remain in the position into which it is shifted while the power device is removed from the implement. Another object is to provide a structure of this kind with means for limiting the extent to which parts of the mechanism may be moved beyond dead center position. A further object is to provide mechanism of this type with means for holding parts of the mechanism in position beyond dead center.

Other objects and advantages will be apparent from the following description of one embodiment of the invention and the novel features will be particularly pointed out hereinafter in connection with the appended claims.

In the accompanying drawings:

Fig. 1 is a perspective view of an agricultural implement provided with mechanism embodying this invention.

Fig. 2 is a fragmentary top plan view thereof.

Fig. 3 is a sectional elevational thereof, on line 3—3, Fig. 2.

Fig. 4 is a sectional elevation thereof, similar to Fig. 3, but showing the parts of the mechanism in different positions.

Fig. 5 is a fragmentary transverse sectional view thereof, on line 5—5, Fig. 4.

Fig. 6 is a fragmentary top plan view of another implement showing mechanism of modified construction embodying this invention applied thereto.

Fig. 7 is a sectional elevation thereof, on line 7—7, Fig. 6.

Fig. 8 is a fragmentary elevation similar to Fig. 7, but showing some of the parts of the mechanism in different positions.

Fig. 9 is a fragmentary sectional view of mechanism embodying this invention of another modified construction, for use on another type of implement.

Fig. 10 is a similar view thereof showing some of the parts in different positions.

Figs. 11 and 12 are fragmentary sectional views of a mechanism of another modified form, the two views showing the mechanism in different positions.

Fig. 13 is a fragmentary view of another mechanism of slightly modified construction.

Fig. 14 is a fragmentary top plan view of mechanism similar to that shown in Fig. 2, but usable with a single acting power unit.

Fig. 15 is a sectional elevation thereof, on line 15—15, Fig. 14.

Agricultural implements have heretofore been provided with detachable power units which can be removed from one implement for use on another implement, and in the case of such implements, manually operated means were relied upon to lock the parts in the desired position when the power unit was removed from the implement. For example, in the case of power propelled or tractor pulled plows, it is desirable to use a power unit to raise the plow shares or disks out of operative relation to the ground into transport position before the power unit is disconnected from the plow, so that the plow without a power unit thereon can be readily transported. Similar constructions are desirable for use in connection with other implements, such as harrows, seeders, or the like, in which certain ground working parts are raised out of operative relation to the ground by power units. While this invention is herein described by way of example as applied to agricultural implements, it is not intended to limit this invention to use in connection with such implements, since it will be obvious that this invention may be applied to other machines or implements, such for example as road or highway maintenance or construction machinery.

In accordance with this invention, a linkage is provided connecting the power unit with a part or parts of an implement or machine to be actuated or shifted, which linkage can be moved into or past a dead center position by means of the power unit, so that when the power unit is rendered inoperative or removed from the implement or machine, the linkage will hold the part of the implement in a set position without requiring a manually actuated locking device. The accompanying drawings show by way of example several embodiments of this invention by means of which this improved linkage may be applied to various implements, and in each of these constructions, it will be noted that a lever and a link are interposed between the power unit and a part to be actuated thereby, this lever and link being so positioned that when the power unit is moved to a predetermined position, the lever and link will move past a dead center position, in which position the linkage will remain while the power unit is removed from the implement, or otherwise rendered inoperative.

In Figs. 1 to 5, there is shown a plow of the type constructed to be drawn by a tractor. This plow includes a rigid frame 20 having suitable ground working implements 21 mounted thereon. The frame of the plow, in the particular construction illustrated by way of example, is mounted on a furrow wheel 22, a land wheel 23, and a third or rear wheel 24. The furrow wheel 22 is mounted on the lower end of a crank axle having an upper portion 25 mounted to oscillate on the frame 20 and the land wheel 23 is mounted on a similar crank axle 27 having a substantially horizontal part 28 also mounted on the frame to oscillate relatively to the same. The rear wheel 24 is mounted on a movable axle 30 to which movement may be imparted from the axle 28 by means of an arm 31 connected by means of a link 32 with an arm 33 suitably connected with the axle 30. By swinging the axles 25 and 28 about their bearings on the frame member 20, the wheels 22 and 23 may be raised and lowered relatively to the frame so that the ground working implements are moved into and out of their ground working positions.

The power unit for turning the crank axles may be of any suitable or desired type having two parts movable relatively to each other, and in the construction shown by way of example, the unit includes a piston 35 arranged to reciprocate in a cylinder 36. This power unit may be of the type in which pressure fluid may be supplied to opposite ends of the cylinder 36 by means of flexible hoses or conduits 37 and 38, Fig. 1. The implement is intended to be drawn by a tractor on which fluid pressure means are provided from which fluid under pressure and under control of the operator may be supplied to either of the conduits 37 or 38 to move the piston 35 into or outwardly with reference to the cylinder 36. Mechanisms according to this invention can be used equally well with a power unit of the type in which the piston is moved in one direction only by means of fluid pressure, provided a spring or other yielding means is provided which yieldingly urges the piston to move in a direction opposite to that in which it is urged by the fluid pressure, at least during the initial return movement of the same. In Figs. 14 and 15, there is shown by way of example a pair of tension springs 36a arranged at opposite sides of the power unit and having their opposite ends connected to lugs or projections secured to opposite sides of the cylinder and the piston, so that these springs constitute parts of the power unit. Any other suitable arrangement of springs on the power unit may be employed so that the piston of the same is, consequently, urged in one direction by fluid under pressure and in the other direction by spring or other yielding means; so that these power units are in a sense "double acting," and this term is herein employed to designate this type of power unit as well as power units in which fluid pressure is employed to move the piston in opposite directions. In power units in which resilient means are employed to move the piston in one direction, one of the conduits for fluid under pressure is omitted, for example, the conduit 37. Such resilient means may be arranged so that they are supplemented by the weight of the ground working tools so that both these means and the weight of the ground working tools and the frame 20 act to move the piston in the direction opposite to that in which it is moved by fluid pressure. It is, of course, also possible to use the spring 36a in connection with a double acting power unit for counterbalancing a part of the weight of the part to be moved by the unit.

The cylinder 36 is mounted at one end thereof for swinging movement relatively to the frame 20, and in the construction illustrated for this purpose in Figs. 1 to 5, one end of the cylinder is provided with lugs or projections 39 pivotally connected by means of a removable pin or bolt 40 on an arm 41 of a bracket. Preferably this bracket is adjustably mounted on a part of the frame 20, and for this purpose the bracket in the construction shown includes two parts 42 extending along opposite sides of a part of the frame 20 and connected therewith by means of a pivot pin 43, see particularly Fig. 5. Adjusting screws 44 and 45 are provided which extend through threaded holes in connecting plates 46 secured to the upper and lower edges of the two parts 42 of the bracket member. The ends of these adjusting screws engage the upper and lower edges of a lug 20a on the frame part 20. By adjusting the screws 44 and 45, the bracket may be swung about its pivot 43 so that the arm 41 thereof may swing to the right or left in Figs. 3 and 4, thus changing the position of the power unit relatively to the frame as may be necessary to provide correct cooperation between the power unit and other parts of the mechanism.

The mechanism for imparting movement from the power unit to the crank axle 28 includes a lever having an arm 48, one end of which is connected with the end of the piston 35 by means of a removable pin or bolt 49, the end of the piston for this purpose being provided with a clevis or bifurcated end 47. This lever is preferably fulcrumed on the part 25 of the crank axle of the furrow wheel 22, to rotate about the axis of this part 25. The hydraulic mechanism may simultaneously actuate both crank axles 25 and 28. A hand lever 51 is a part of the connection between the two axles 25 and 28. This lever cooperates with a ratchet shown in Fig. 1 which has an extension 51a connected at its rear end with an arm 51b secured on the axle 28. The lever 51 is pivoted at its lower end to the ratchet extension 51a and is also pivoted at a distance from its lower end to an arm 51c, which is secured to the axle 25. Consequently, when the lever 51 is adjusted down, it lengthens the distance between the two arms 51b and 51c and when it is adjusted up, it shortens the distance. This results in a movement of the wheel 22 when the axle 28 is held stationary by the hydraulic mechanism, and also when the hydraulic mechanism is actuated, turning of the axle 28 results in swinging the axle 25 through the arm 51b, the extension 51a of the ratchet, the hand lever 51 and the arm 51c.

This adjustment including the hand lever 51 serves to level the plow for the following reason: When plowing 4" deep, wheel 23, which runs on the unplowed land, is 4" above the points of the shares 21 and when plowing 8" deep it is 8" above the share points. In both these cases the wheel 22, which runs in the furrow must be level with the points. Therefore, when changing from one depth of plowing to another it is necessary to adjust lever 51 to keep the plow level. Of course when the plow is lifted at the end of the field by the hydraulic cylinder it is not necessary to touch lever 51, since in transport position it is not necessary to have the plow exactly level. The lever arm 52 is formed of a pair of closely spaced parts between which the arm 48 extends and to which it may be welded or otherwise rigidly secured so that the arms 48 and 52 form a rigid lever. The end of the arm 52 is connected by means of a pivot pin or bolt 53 to a link 54 which extends between the two parts of the arm 52 of the lever. The other end of this link is connected by means of a pivot pin or bolt 55 to two closely spaced arms 56 between which the link 54 extends. This two-piece arm is welded or otherwise rigidly secured to the part 28 of the crank axle 27.

By admitting fluid under pressure to the cylinder 36 in the construction described, the lever comprising the two arms 48 and 52, the link 54 and the arms 56 may be swung into various positions to lower the land wheel 23 to various positions relatively to the frame 20 for raising the ground working tools to the desired extent. In Fig. 4, the mechanism is shown in the position in which the crank axles are swung to raise the wheel or wheels and thus lower the ground working tools 21, and when the piston is moved to the limit of its movement outwardly with reference to the cylinder, the parts will be in the positions shown in Fig. 3. It will then be noted that the pivot member 53, connecting the lever arm 52 and the link 54, has moved beyond the dead center position between the axis of the crank axle part 25 and the pivot 55. This clearly is shown by the broken line 58 passing through the axis of the crank axle part 25 and the pivot 55. When these parts are in the positions as shown in Fig. 3, the ground working tools 21 will be in raised position for transport.

Some stop means must be provided for preventing the parts from moving to any substantial extent farther beyond their dead center positions. Such stop means may be of any suitable or desired construction, and as shown in Figs. 2 to 4 the two parts of the lever arm 52 are provided with a part connecting the two parts of this arm and which may be engaged by an extension 59 of the link 54 when the link and lever arms 52 have swung beyond the dead center position to the desired extent. This stop member in the construction shown is in the form of a U-shaped piece 60 straddling the two parts of the lever arm 52 and welded or otherwise secured thereto.

When the extension 59 of the link 54 rests on the stop 60, the ground working implements will be in their raised positions and cannot be moved out of their raised positions without first moving the arm 52 and link 54 out of their dead center positions. Consequently, the power unit is no longer required to hold the wheels in their lowered position and this unit may be disconnected and removed from the implement by merely removing the pins 40 and 49, so that the power unit may be used elsewhere. The parts of the implement then remain in position for transport without requiring the use of any locking device for holding the parts in such positions. This greatly facilitates the removal or replacing of the power unit, since it is merely necessary for the operator to supply fluid to the head portion of the cylinder 36 to move the piston 35 to the limit of its outward movement whereupon the parts of the mechanism will remain in this position without requiring the operator to use any locking means to hold the parts in this position, while removing the power unit. In case a spring or other resilient means are used for the return movement of the piston, the supply of pressure fluid to the unit is not turned off until after the unit has been disconnected from the implement.

When the power unit is again replaced on the implement, fluid under pressure is admitted to the unit to force the piston to one end of its stroke, for example, to the outer end in the construction shown, whereupon the unit can readily be secured to the implement by means of the pins 40 and 49. If the piston is moved in one direction by resilient means, the fluid pressure used to force the piston outwardly is kept on while the unit is connected to the implement. When the implement is to be used for working the ground, the lever arm 52 and link 54 are moved out of dead center relationship either by fluid pressure acting on the piston to move it inwardly or by releasing fluid pressure acting on the piston and permitting the spring 36a to move these parts out of dead center relation, after which the ground working tools may be adjusted as usual by means of the power unit.

If desired, additional means may be provided for ensuring that the parts of the mechanism will remain in a position at or past dead center as illustrated in Fig. 3 when the implement is subjected to vibrations and jarring, such for example, as might occur during transport of the implement. In the construction shown for this purpose, a spring 62 is provided which normally acts to urge the crank arms 52 and the link 54 into the positions shown in Fig. 3. This spring is arranged about a rod 63 which passes through a hole in the guide plate 64 and the end portion of this rod is arranged between the two closely spaced parts of the arm 56. The outer end of the rod is pivotally connected at 65 to the link 54, for example, to a projection or bracket 66 welded or otherwise arranged on the link 54. The operation of this spring will be readily understood by reference to Figs. 3 and 4. When the links are in the position shown in Fig. 4, the spring 62 is expanded. As the twin arms 56 and the link 54 are moved toward the dead center position, the spring 62 will be compressed, thus urging the extension 59 of the link 54 against the stop member 60 and thus yieldingly holding the arms 52 and link 54 in the position past dead center, as shown in Fig. 3.

Preferably when the parts are in dead center position, as shown in Fig. 3, the piston rod 35 should be near one end of its stroke, such for example, at the outer end of the stroke. In order to make sure that the stroke of the piston 35 is sufficient to move the lever arm 52 and link 54 through and beyond dead center position, the particular location of the power mechanism may be controlled by adjusting the arm 41 of the bracket 42 relatively to the frame member so that the power unit will be so positioned as to be able to move the arms 52 and link 54 through and beyond their dead center position.

In Figs. 6 to 8, there is shown another mechanism for operating upon the same principle as that described in connection with Figs. 1 to 4. In this construction, 70 represents members or parts of the frame of the implement on which the power unit including the cylinder 36 and piston 35 may be mounted. One part or end of the power unit, for example, the cylinder 36, may be adjustably mounted on the frame 70 by means of a bracket 71 secured to the frame and extending upwardly therefrom. The upper end of this bracket is in the form of a sleeve or collar 72 bored to receive a screw-threaded rod 73, one end of which is provided with an eye 74 through which the removable pin or connecting bolt 40 may extend. The rod 73 cooperates with nuts 77 by means of which the location of the power mechanism relatively to the implement may be controlled.

In this construction, it is desired to use the power unit to swing a shaft 75, which may be a part of the crank axle, and if desired, it is also possible to use a power mechanism for swinging a shaft 76 about its axis, both of these shafts being suitably mounted to swing about the frame member 70, for example, on bearing brackets 78 and 79 shown in Fig. 6.

In this construction, the outer end of the piston 35 is connected to an arm 80 of a lever rotatable about the axis of the shaft 76. This lever has a pair of closely spaced arms 81 to which the arm 80 is rigidly connected, for example, by welding. The piston is pivotally connected by means of the removable pivot pin 49 to the arm 80 and the arms 81 are pivoted at 82 to a link 83. The shaft 75 has a pair of closely spaced arms 85 welded or otherwise secured thereto, the other ends of these arms being connected to the link 83 by a pivot 86. The operation of this mechanism is similar to that described in Figs. 1 to 4. When the piston 35 is forced out of the cylinder to the limit of its movement, the arm 81 of the lever is swung about the axis of the shaft 76, so that the pivot pin 82 connecting the link 83 with the arms 81 will have moved beyond a dead center position between the axis of the shaft 76 and of the pivot pin 86. The broken line 87 in Fig. 7 extends through the centers of the shaft 76 and pin 86 so that it will be clearly evident that the pivot pin 82 had moved from a position above the line 87 to the position shown in Fig. 7 below the line. By comparing the position of the parts in Figs. 7 and 8, it will be obvious that the crank portion 88 of the shaft 75 is in a more nearly upright position when the arms 81 and link 83 have moved beyond dead center position, and if the parts 75 and 88 form a part of the crank axle of the wheel, it will be obvious that the frame 70 will be raised relatively to the wheel, to move any ground working tools mounted on the frame upwardly into transport position.

In order to prevent the movement of the pivot 82 farther beyond the dead center position than shown in Fig. 7, the link 83 is provided with an extension 89 having a partly circular recess 90 in an edge portion thereof which is so positioned that when the parts are past dead center position to the desired extent, this recess portion 90 will engage with a bearing sleeve 91 on the shaft 76, to which bearing sleeve the lever arms 80 and 81 are secured, to prevent farther movement beyond the dead center position.

In order to urge and yieldingly hold the link 83 in the position shown in Fig. 7, a spring 93 is employed. One end of this spring is connected with a lug or projection 94 on the link 83 opposite to the extension 89 thereof and a bracket 95 is secured to the arms 85. It will, consequently, be obvious that when the parts of the mechanism are in the position shown in Fig. 7, the spring 93 will yieldingly hold the parts in this position so as to prevent movement of these parts out of dead center position when the implement on which the parts are mounted is subjected to jars or vibrations during transport.

The operation is very similar to that described in connection with Figs. 1 to 4. When the parts of the mechanism are in the position shown in Fig. 7, the movable pins 40 and 49 may be removed so that the power unit can readily be removed from the implement for use elsewhere. The power unit may be of the type in which the piston is moved into its inner position by fluid pressure or of a type in which the piston is moved in one direction by fluid pressure and in the other direction by a spring or other resilient means.

Figs. 9 and 10 represent another arrangement of parts in which the lever comprising the two arms 100 and 101 is mounted to swing about the axis of a shaft 102 which as described in connection with Figs. 1 to 8 may be a part of a crank axle on which a wheel of the implement is mounted, and this lever may be either rigidly connected with the shaft 102 or may be secured on a sleeve 103 which may oscillate about the shaft 102, or the lever may oscillate about any other axis on the frame of the implement. The arm 100 of the lever is connected with a part of the power unit, for example, with the piston rod 35 by means of the removable pivot pin 49. The power unit may be of either of the two types heretofore described.

The arm 101 of the lever, which as in the other constructions described, is formed of two closely spaced parts, between which the other lever arm 100 is secured. This arm is connected by means of a pivot pin or bolt 105 to a link 106 which also extends between the two parts of the arm 101. This link also extends between two closely spaced parts of an arm 108 mounted on a shaft 109, which is to be oscillated by means of the power unit. A pivot pin or bolt 107 connects the link 106 with the arm 108. The shaft 109, in the construction shown, terminates at one end thereof in a downwardly extending crank arm 110, to the lower end of which a wheel or other part to be moved may be connected. The two shafts 102 and 109 are suitably mounted on a frame member 112.

The lever arm 101 and the link 106 are so arranged relatively to each other that when the power unit is at or near one end of its stroke, the pivot pin 105 will move through the dead center position between the axis of the shaft 102 and of the pivot 107, as shown in Fig. 9.

In order to stop farther movement of the link 106 and lever arm 101, beyond their dead center positions, the link 106 is provided with an extension 113 and a stop or abutment member 114 is welded or otherwise secured to the two parts of the lever arm 101. Consequently, when the parts are past their dead center positions, as shown in Fig. 9, the extension 113 of the link 106 will engage the stop or abutment member 114, as shown in Fig. 9, to limit farther movement of the lever arm 101 and link 106 beyond their dead center positions.

In the construction shown in Figs. 9 and 10, a manually operated member is provided for preventing movement of the link 106 out of its position beyond dead center.

In the construction shown for this purpose, a lock or holding member 115 is provided for this purpose, which is pivoted at 116 on a lug or extension of the lever arm 100, this holding member 115 preferably being of U-shape to straddle the lug through which the pivot pin 116 extends. A spring 117 is provided to hold the lock member either in operative or inoperative position. For this purpose, one end of the spring is connected with the lever arm 100 and the other end is connected with the lock member 115 at a point between the outer end thereof and the pivot pin 116. When the parts of the mechanism are in dead center position, the lock member 115 may, if desired, be moved about its pivot 116 from the inoperative position shown in broken lines in Fig. 9, and in full lines in Fig. 10, to the full line position shown in Fig. 9. When in this latter position, it will be obvious that the lock member 115 extends into close proximity to the extension 113 of the link 106, and thus prevents the extension of the link from moving upwardly out of its dead center position. During the ordinary use of the implement, the lock member 115 is held by the spring 117 in the position shown in Fig. 10, in which this lock member will in no way interfere with the use of the implement. It will be noted that the spring 117 will hold the lock member in this position, and if the lock member is swung into its locking position, shown in full lines in Fig. 9, this spring will also act to hold the lock member in this position. The operation of this mechanism will be readily understood, since it is very similar to that shown in Figs. 7 and 8, and when the parts are in the position shown in Fig. 9, the power unit may be readily removed from the implement.

In Figs. 11 to 13, we have shown an adaptation of our idea to seed drills, cultivators, or similar agricultural implements, including a frame member 120 and a control rod 121 which is suitably connected with certain parts of the implement (not shown) to move such parts into an inoperative or transport position. In this case, the links and levers forming a part of the actuating mechanism may be arranged in horizontal planes and the power unit, which may be of either of the two types heretofore described, is anchored at one end thereof on a bracket or extension 122 of the frame member 120. This bracket is provided with a sleeve portion 124 through which a threaded eye bolt 125 extends, the eye of which is secured to the clevis on the end of a piston by means of the removable pivot pin 49. Nuts 127 and 128 may be used for adjusting the eye bolt 125 in the direction of its length for correctly positioning the power unit to the implement.

In this construction, the cylinder 36 is connected by means of the removable pivot pin 40 to one arm 129 of a lever, the other arm 130 being formed of two closely spaced parts between which the arm 129 extends and to which it is suitably secured, for example, by welding. The lever is pivoted by means of a pin 132 to a bracket 133 also secured to the frame member 120. The lever arm 130 is hingedly connected to one end of a link 135 by means of a pin or bolt 136. This link 135 is of partly circular or arc-shaped form and the other end thereof is pivoted at 137 to an arm 138 of a bell crank lever mounted to rotate about the axis of a shaft 139 mounted on the frame 120. The other arm 140 of the bell crank lever is pivotally connected with the control rod 121, which actuates a part of the implement.

When the power unit is near the limit of one end of its path of travel, the parts will occupy the positions shown in Fig. 11, in which the pivot pin 136 connecting the link 135 with the arm 130 of the lever will have moved beyond the dead center position between the axes of the pivot members 137 and 132. A stop member is also provided for limiting the extent to which the pivot member 136 may move beyond the dead center position, and in the construction shown for this purpose, a bracket or extension 143 is welded or otherwise secured to the link 135. This bracket is threaded to cooperate with a threaded bolt or stud 145 adjustably mounted thereon and located in such position that when the parts are in the positions shown in Fig. 11, the head of the bolt or stud 145 will engage the lever arm 129, and thus prevent further swinging of this lever.

Since this construction is generally used on an implement in such a manner that the link and levers are in horizontal positions, it is not generally necessary to provide means for holding the link and lever in a position beyond dead center. However, if such holding means are desired, they can readily be applied and arranged as shown in some of the preceding figures.

In Fig. 13, we have shown a mechanism very similar to the one shown in Figs. 11 and 12 and differing therefrom mainly in that the lever arm 148 which corresponds to the lever arm 129 in Figs. 11 and 12 is provided with an extension 150, which is so arranged that when the parts are moved beyond dead center position as shown in Fig. 13, the extension 150 will engage a part of the frame member 120, and thus limit the extent to which the pivot member 135 may move beyond dead center position.

The foregoing modified forms illustrate various ways of utilizing mechanism embodying this invention, and it will be understood that this mechanism may be applied to other agricultural implements than those herein specifically referred to. In all of the applications of this invention as herein described, it is merely necessary for the operator of the implement or tractor drawing the same, to actuate a valve or valves to move the movable member of the power unit to one end of its path of movement, whereupon the movable part of the implement will automatically be located in position for transport or for other purposes and the parts of the mechanism will then be held in such positions without requiring further use of a power unit. By means of these constructions, the power unit may be readily removed from or attached to any of the mechanisms shown and it is not necessary for the operator to apply a locking pin or other locking device to the mechanism to hold the same in the desired position.

It will be noted that in each construction shown when parts of the mechanism are in or past dead center positions the relatively movable parts of the power unit are not in or near a dead center position, so that the power unit can readily move the lever arm to which it is connected, to move other parts of the mechanism into and out of dead center position.

While it is preferred to have the link and the lever arm connected therewith moved past dead center relation to each other, it will be obvious that when means are provided, such as the springs 62 and 93 or the lock member 115, it is not necessary to move this lever arm and the link past dead center positions, since, if desired, the springs and lock member may be relied upon to prevent the arm and link from moving out of their approximately dead center positions.

The term "approximately dead center position" is herein used to indicate that the lever and link are in dead center position, or near dead center position, or past dead center position.

It will be understood that various changes in the details, materials and arrangements of parts which have been herein described and illustrated in order to explain the nature of the invention, may be made by those skilled in the art within the principle and scope of the invention, as expressed in the appended claims.

We claim as our invention:

1. In a ground working implement having a frame and an implement part shiftable relatively thereto, a power unit having two parts movable toward and from each other, and means for connecting one of said parts of said power unit to said frame, that improvement which includes a bell crank lever pivotally mounted on said frame, means for connecting the other part of said power unit to one arm of said lever for swinging the same, a link connecting the other arm of said lever and said shiftable improvement part, said lever and said link being so arranged relatively to each other that when said parts of said power unit are substantially in one extreme of their relative movement, said other arm of said lever and link will be approximately in dead center relation to each other for holding said shiftable part of said implement in an extreme position of its path of movement, and stop means for limiting the extent to which said other arm of said lever and link may be moved to approximately their dead center positions relatively to each other, whereby said shiftable part of said implement will be retained in said extreme position when said power unit becomes inoperative, and means actuated by the movement of said lever and link for releasably holding said link and said other arm of said lever in their approximately dead center relations and in engagement with said stop means.

2. Mechanism according to claim 1 in which said holding means is resilient for yieldingly urging said link and said other arm of said lever into said approximately dead center position and into engagement with said stop means.

3. Mechanism according to claim 1 and in which said holding means include a holding member movable into a position with relation to said link when in approximately dead center position for opposing movement of said link out of said position.

4. A ground working implement having a frame and an implement part shiftable relatively thereto, a power unit having two parts movable relatively to each other, a lever pivotally mounted on said frame and to which one of said parts of said power unit is connected for swinging said lever, a link connected with said lever and said shiftable implement part, said lever and said link being so arranged relatively to each other that when said parts of said power unit are substantially at one end of their relative movement, said lever and link will be approximately in dead center relation to each other for holding said shiftable part of said implement in a predetermined position of its path of movement independently of said power unit, a stop for limiting the extent to which said lever and link may be moved into said approximately dead center positions relatively to each other, and an adjustable part on said frame to which the other part of said power unit is connected to position said power unit so that when two parts thereof are at one end of their path of movement relatively to each other, said lever and link will be in approximately dead center position relatively to each other.

5. In a plow having a frame, ground working tools mounted on said frame, a crank axle oscillatably mounted on said frame and having a frame supporting wheel journalled thereon, said crank axle, when oscillated, raising and lowering said frame, that improvement which includes a power unit having two parts movable toward and from each other, means for connecting one of said parts of said power unit to said frame, a lever pivotally mounted on said frame, means for connecting the other part of said unit to said lever for swinging the same, a link pivotally connected at one end thereof with said lever, a crank arm on said crank axle and pivotally connected with the other end of said link, said lever and said link being so arranged relatively to each other that when said parts of said power unit are approximately at one end of their relative movement, said lever and link will be at approximately dead center position relatively to each other for holding said crank axle in a position in which said frame is raised, and stop means for limiting the extent to which said lever and link may be moved into approximately dead center position relatively to each other, whereby said crank axle will be retained in position in which said frame is raised due to said approximately dead center relationship between said lever and link and without the action of said power unit.

6. In a plow having a frame, ground working tools mounted on said frame, a crank axle oscillatably mounted on said frame and having a frame supporting wheel journalled thereon, said crank axle, when oscillated, raising and lowering said frame, that improvement which includes a power unit having a piston part and a cylinder part, means for connecting one of said parts of said power unit to said frame, a lever pivotally mounted on said frame and to which the other part of said power unit is pivotally connected for swinging said lever, a link pivotally connected at one end thereof with said lever, a crank arm on said crank axle and pivotally connected with the other end of said link, said lever and said link being so arranged relatively to each other that when said parts of said power unit are approximately at one end of their relative movement, said lever and link will have swung beyond dead center position relatively to each other for holding said crank axle in a position in which said frame is raised, stop means for limiting the extent to which said lever and link may be moved beyond said dead center position, whereby said crank will be retained in position in which said frame is raised without force supplied thereto by said power unit, said means connecting the part of said power unit to said frame being adjustable to enable said unit when approximately at one end of its path of movement to swing said lever and link past dead center position, and means for holding said lever and link in said past dead center position.

7. In a plow having a frame, ground working tools mounted on said frame, a pair of crank axles having frame supporting wheels journalled thereon and each having substantially horizontal portions oscillatably mounted on said frame, said crank axles when oscillated, raising and lowering said frame, that improvement which includes a power unit having two parts movable toward and from each other, means for connecting one of said parts of said power unit to said frame, a lever pivotally mounted on the horizontal portion of one of said crank axles, means for connecting the other part of said power unit to said lever for swinging the same, a link connected at one end thereof with said lever, a crank arm extending outwardly from said horizontal portion of said other crank axle and pivotally connected with said link, said lever and link being so arranged relatively to each other that when said parts of said power unit are approximately at one end of their relative movement, said lever and link will be beyond dead center position relatively to each other for holding said other crank axle in a position in which said frame is raised, and stop means for limiting the extent to which said lever and link may be moved beyond dead center position relatively to each other.

8. A plow construction according to claim 7 and including a connection between said two crank axles whereby movement of the second crank axle is transmitted to said first crank axle.

9. In a plow having a frame, ground working tools mounted on said frame, a pair of crank axles having frame supporting wheels journalled thereon and each having substantially horizontal portions oscillatably mounted on said frame, said crank axles when oscillated, raising and lowering said frame, that improvement which includes a power unit having two parts movable toward and from each other, means for connecting one of said parts of said power unit to said frame, a lever pivotally mounted on said frame, means for connecting the other part of said power unit to said lever for swinging the same, a link connected at one end thereof with said lever, a crank arm extending outwardly from said horizontal portion of said other crank axle and pivotally connected with said link, said lever and link being so arranged relatively to each other that when said parts of said power unit are approximately at one end of their relative movement, said lever and link will be beyond dead center position relatively to each other for holding said other crank axle in a position in which said frame is raised, and an adjustable connection between said two crank axles whereby movement of said second crank axle is transmitted to said first crank axle and whereby the positions of said crank axles about their axes may be varied.

10. A ground working implement according to claim 4 in which positive means are provided for holding said link and lever in approximately dead center relation, which means are manually movable out of holding position.

11. A ground working implement according to claim 4 and in which said power unit is actuated in one direction by power, and spring means associated with said power unit for swinging said lever in the other direction.

References Cited in the file of this patent

UNITED STATES PATENTS

| | | |
|---|---|---|
| 591,535 | Kerns et al. | Oct. 12, 1897 |
| 611,912 | Jones et al. | Oct. 4, 1898 |
| 617,338 | Heylman | Jan. 10, 1899 |
| 669,641 | Heylman | Mar. 12, 1901 |
| 964,761 | Davis | July 19, 1910 |
| 2,526,028 | Johnson | Oct. 17, 1950 |
| 2,555,554 | Miller | June 5, 1951 |
| 2,613,584 | Toland | Oct. 14, 1952 |
| 2,638,044 | Toland | May 12, 1953 |